United States Patent
Okada

(10) Patent No.: US 10,044,888 B2
(45) Date of Patent: Aug. 7, 2018

(54) IMAGE FORMING APPARATUS AND CONTROL METHOD THEREOF

(71) Applicants: Kabushiki Kaisha Toshiba, Tokyo (JP); Toshiba Tec Kabushiki Kaisha, Tokyo (JP)

(72) Inventor: Yuuki Okada, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 977 days.

(21) Appl. No.: 14/453,232

(22) Filed: Aug. 6, 2014

(65) Prior Publication Data

US 2016/0044191 A1    Feb. 11, 2016

(51) Int. Cl.
 G06F 3/048 (2013.01)
 H04N 1/00 (2006.01)
 G06F 3/0481 (2013.01)
 G06F 3/0482 (2013.01)
 G06F 3/0488 (2013.01)
 G06F 9/451 (2018.01)
 G06F 9/44 (2018.01)

(52) U.S. Cl.
 CPC ....... *H04N 1/00506* (2013.01); *G06F 3/0482* (2013.01); *G06F 3/0488* (2013.01); *G06F 3/04817* (2013.01); *G06F 9/4443* (2013.01); *G06F 9/451* (2018.02); *H04N 1/00392* (2013.01); *H04N 1/00411* (2013.01); *H04N 1/00413* (2013.01); *H04N 1/00474* (2013.01); *H04N 1/00514* (2013.01)

(58) Field of Classification Search
 CPC ............ H04N 1/00506; G06F 3/04817; G06F 3/0482; G06F 3/04847; G06F 3/0488
 See application file for complete search history.

(56) References Cited

U.S. PATENT DOCUMENTS

| | | | |
|---|---|---|---|
| 7,017,118 B1* | 3/2006 | Carroll | G06F 3/0481 345/160 |
| 7,149,985 B1* | 12/2006 | Crosby | G06F 3/0481 715/851 |
| 2006/0001758 A1* | 1/2006 | Nam | G06T 11/60 348/333.12 |
| 2007/0171450 A1* | 7/2007 | Yoshida | G06F 3/04817 358/1.13 |

(Continued)

*Primary Examiner* — William Bashore
*Assistant Examiner* — Gregory A Distefano
(74) *Attorney, Agent, or Firm* — Patterson & Sheridan, LLP

(57) ABSTRACT

An image forming apparatus includes an operation display unit, a display range registration unit, an icon registration unit, and a display control unit. In the operation display unit, an icon for selecting an image forming apparatus operation is displayed. In the display range registration unit, information on a display range of the icons displayed on the operation display unit is registered. In the icon registration unit, information on a display position of the icon on the operation display unit is registered. In the display control unit, a movement button for moving the icon based on the information on the display range which is registered in the display range registration unit is displayed when the icon is selected. In the display control unit, the information on the display position which is registered in the icon registration unit is updated when the movement button is pressed.

16 Claims, 10 Drawing Sheets

| ICON ID | POSITION ID | FUNCTION |
|---|---|---|
| 1 | a | COPY |
| 2 | f | SCANNING |
| 3 | g | FAX |
| ⋮ | ⋮ | ⋮ |

(56) References Cited

U.S. PATENT DOCUMENTS

| | | | |
|---|---|---|---|
| 2008/0184112 A1* | 7/2008 | Chiang | G06F 3/04817 715/700 |
| 2009/0199109 A1 | 8/2009 | Doui | |
| 2011/0279350 A1* | 11/2011 | Hutchinson | G09B 5/067 345/1.1 |
| 2012/0306929 A1* | 12/2012 | Chalkov | G06F 3/0488 345/666 |
| 2014/0181749 A1* | 6/2014 | Takikawa | G06F 3/04817 715/835 |

* cited by examiner

FIG. 4

| ITEM NAME | VALUE |
|---|---|
| NUMBER OF DISPLAYS IN THE VERTICAL DIRECTION | 3 |
| NUMBER OF DISPLAYS IN THE HORIZONTAL DIRECTION | 4 |
| NUMBER OF PAGES | 1 |
| SCROLL | NO |

| ICON ID | POSITION ID | FUNCTION |
|---|---|---|
| 1 | a | COPY |
| 2 | f | SCANNING |
| 3 | g | FAX |
| ⋮ | ⋮ | ⋮ |

60

IMAGE FORMING APPARATUS AND CONTROL METHOD THEREOF

BACKGROUND

In an image forming apparatus of the related art, it may be possible for a user to register, in advance, a functional icon for selecting on a display unit such as a touch panel, an operation of the image forming apparatus. In such an image forming apparatus, it is possible to register a plurality of such functional icons on the operation display unit at desired positions thereon. However, there arises an issue when a new icon is attempted to be positioned at, or an existing icon is desired to be moved to, a position on the display unit where a different icon already is located.

DESCRIPTION OF THE DRAWINGS

FIG. 4 is a diagram illustrating a registration example of a display range of an icon according to the embodiment.

FIG. 5 is a diagram depicting a first icon registration data according to the embodiment.

DETAILED DESCRIPTION

Figure 1:
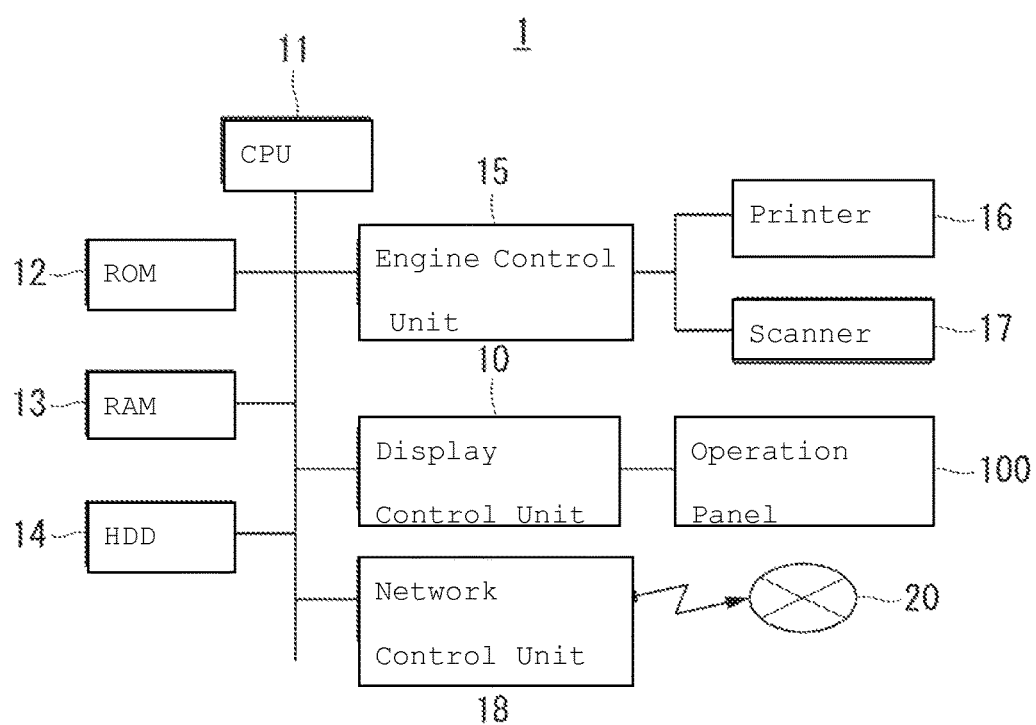
FIG. 1 is a diagram illustrating a configuration example of an image forming apparatus according to an embodiment.

In general, according to one embodiment, an image forming apparatus includes an operation display unit, a display range registration unit, an icon registration unit, and a display control unit. In the operation display unit, an icon for selecting an image forming apparatus operation is displayed. In the display range registration unit, information on a display range of the icons displayed on the operation display unit is registered. In the icon registration unit, information on a display position of the icon on the operation display unit is registered. In the display control unit, a movement button for moving the icon based on the information on the display range which is registered in the display range registration unit is displayed when the icon is selected. In the display control unit, the information on the display position which is registered in the icon registration unit is updated when the movement button is pressed.

Hereinafter, the image forming apparatus according to the embodiment will be described with reference to drawings. In addition, the same portion or item in each drawing will be given the same reference numeral.

FIG. 1 is a diagram illustrating a configuration example of the image forming apparatus according to the embodiment. In FIG. 1, an image forming apparatus 1 includes a display control unit 10, an operation panel 100, a Central Processing Unit (CPU) 11, a Read Only Memory (ROM) 12, a Random Access Memory (RAM) 13, a Hard Disk Drive (HDD) 14, an engine control unit 15, a printer 16, a scanner 17, and a network control unit 18.

The display control unit 10 controls the operation panel 100. The operation panel 100 will be described in detail using FIG. 2.

Figure 2:
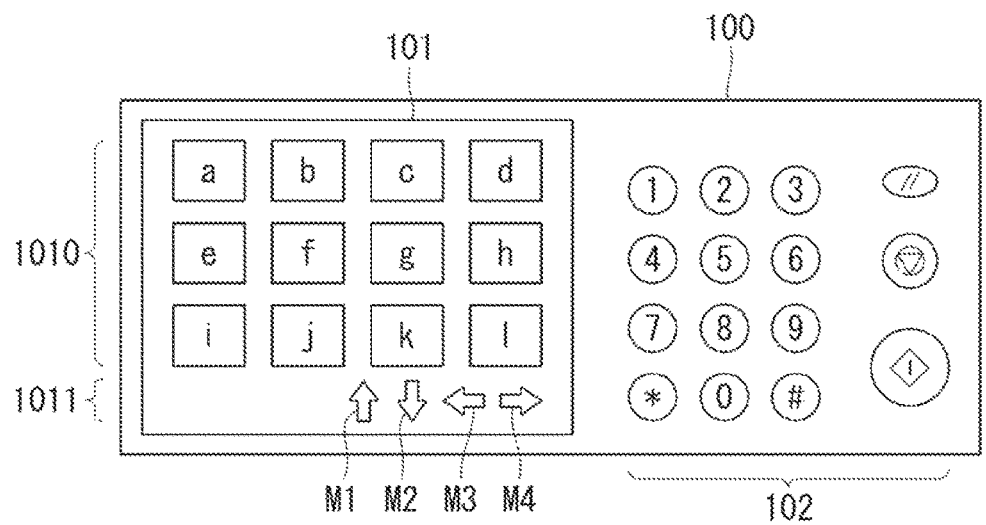
FIG. 2 is a diagram illustrating a configuration example of an operation panel according to the embodiment.

FIG. 2 is a diagram illustrating a configuration example of the operation panel according to the embodiment. In FIG. 2, the operation panel 100 includes a touch panel 101 which is exemplified as an operation display unit, and a hard key keypad group 102. The touch panel 101 displays icons 1010, and movement buttons 1011 for moving the icons 1010.

FIG. 2 exemplifies a case in which the touch panel 101 displays the icons 1010 using three rows and four columns which are denoted by display positions of "a" to "l".

The "icon" of the embodiment described herein is a touch panel location display which is used to select a desired operation of the image forming apparatus 1. The icon is displayed on the touch panel 101 in a predetermined shape or pattern to be pressed by a user to select an operation or function of the image forming apparatus 1. The icon may include a text button which displays text, for example.

A user may create an icon in advance which represents, and when touched causes execution of, a desired operation with respect to the image forming apparatus 1. The desired operation with respect to the image forming apparatus 1 may be, for example, setting of copy conditions such as setting of scanning conditions, copy magnification, post processing operations, settings for transmitting a scanned document to a server, and settings for transmitting the document to a predetermined destination using a fax machine, or the like.

It is possible for a user to customize the position of icons, by registering the created icon at a preferable display position of "a" to "l" on the touch panel 101. In this manner, the user is able to easily locate the registered icon according to a display position of the icon.

The movement touch button 1011 according to the embodiment includes press buttons representing four directions of an up button M1, a down button M2, a left button M3, and a right button M4. However, the arrangement of the touch buttons is not limited to this configuration. The movement touch buttons may be arranged for eight directions of movement by further adding four directions of upper left, lower left, upper right, and lower right, for example. In addition, touch buttons for moving a specific selected icon of the icons 1010 to a specific display position such as a "front" touch button which moves the icon 1010 to the first display position of "a", and a "rear" touch button which moves the icon to the display position of "l", i.e., the last display position of the touch buttons may be used.

Returning again to FIG. 1, the display control unit 10 transmits display information regarding the icons 1010 and the movement button 1011 which are displayed on the touch panel 101 with respect to the operation panel 100. In addition, the display control unit 10 receives operational information from the operation panel 100 when the touch panel 101 or a button on the hard key keypad group 102 is pressed by a user. Movement control of the icons 1010 by the display control unit 10, which is displayed on the touch panel 101, will be described later herein.

The CPU 11 is a main CPU which controls operations of the image forming apparatus 1. The CPU 11 executes, for example, a program which is recorded in the ROM 12 or the HDD 14, and is developed in the RAM 13 by reading thereof. According to the embodiment, a case in which the display control unit 10 controls the operation panel 100 will be described. However, the CPU 11 may directly control the operation panel 100.

The engine control unit 15 controls hardware of the image forming apparatus 1 such as the printer 16, and the scanner 17. Since the timing control of operations is important in the hardware such as the printer 16 or the scanner 17, for example, the printer 16, or the like, may be controlled by incorporating firmware in Large Scale Integration (LSI) such as an Application Specific Integrated Circuit (ASIC) in the engine control unit 15.

The network control unit 18 controls communications through a network 20. The network control unit 18 is provided using a Network Interface Card (NIC), for example. The image forming apparatus 1 may receive, for example, print data from a computer which is connected to the network 20 through the network control unit 18. In addition, the network control unit 18 may provide a Web screen to the computer which is connected to the network 20 by being provided with a Web server function.

Figure 3:
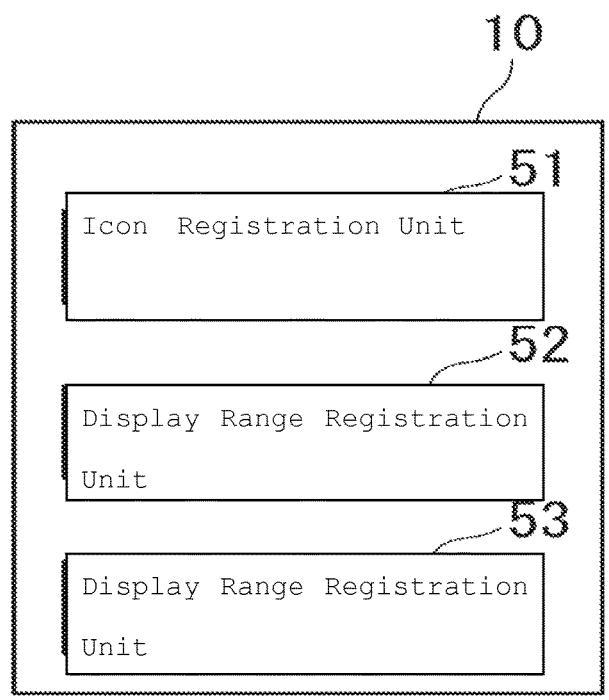
FIG. 3 is a diagram illustrating a configuration example of a functional block of a display control unit according to the embodiment.

Hereinafter, control of the operation panel 100 by the display control unit 10 will be described using FIG. 3. FIG. 3 is a diagram illustrating a configuration example of a functional block of the display control unit 10 according to the embodiment.

In FIG. 3, the display control unit 10 includes an icon registration unit 51, a display range registration unit 52, and a function registration unit 53.

The icon registration unit 51 performs registration control of the icons 1010 which are displayed on the touch panel 101. In the registration of the icons 1010, an initial registration in which a display position and a function of an individual icon are registered, as well as registration of a change in the display position of the icon due to a movement of the icon, which will be described later herein, are provided. A movement control unit for moving the display position of the icon will be described later herein in greater detail.

The display range registration unit 52 registers information concerning the available display range, i.e. positions and locations thereof, of the icons 1010 displayed on the touch panel 101. An example of registering the information of the display range of the icons 1010 will be described using FIG. 4. FIG. 4 is a diagram illustrating a registration example of the display range of the icons 1010 according to the embodiment.

In FIG. 4, display range data 521 includes fields of an "item name" and a "value". FIG. 4 exemplifies a case in which the "number of displays in the vertical direction" and the "number of displays in the horizontal direction" are settable as an "item name". The number of displays in the vertical direction denotes the number of display rows of icons 1010 shown on the touch panel 101 screen, and the number of displays in the horizontal direction denotes the number of display columns of the icons 1010 shown on the touch panel 101 screen. FIG. 4 exemplifies a case in which the display range of three rows and four columns as illustrated in FIG. 2 has been selected.

In addition, the number of pages of the icons 1010 which are displayable on the touch panel 101 may be registered in the display range data 521. For example, where the number of pages is set to two, and the number of displays in the vertical direction is set to 4 and the number of displays in the horizontal direction is set to 3, there are two pages of the display range of the three rows and four columns of icons as illustrated in FIG. 2, and it is possible to register 3×4×2=24 icons. In addition, a selection of, for example, "scrolling" or "page switching" may be registered in the display range data 521, as a method of displaying and icon when the number of icons to be registered exceeds the number which can be displayed simultaneously on the touch panel 101. FIG. 4 exemplifies a case in which the "page switching" is selected by setting the "scrolling" to be "NO".

Returning to FIG. 3 again, operations of the image forming apparatus 1 which are instituted when an individual icon in the icons 1010 is pressed are registered in the function registration unit 53. For example, an operation for selecting, and thus initiating, a function such as copying, faxing, and scanning is registered in the function registration unit 53.

In addition, a part or all of the functions of the icon registration unit 51, the display range registration unit 52, and the function registration unit 53 are located in software which is executed by the CPU built in the display control unit 10. However, locating of the icon registration unit 51, the display range registration unit 52, and the function registration unit 53 is not limited to the use of software. For example, a part, or all of the functions of the icon registration unit 51, the display range registration unit 52, and the function registration unit 53 may be located on exclusive hardware. In addition, a part, or all of the functions of the icon registration unit 51, the display range registration unit 52, and the function registration unit 53 may be located in firmware using LSI, or the like.

Subsequently, position control of the icons 1010 by the display control unit 10 will be described using FIGS. 5 to 10. FIG. 5 is a diagram depicting first icon registration data according to the embodiment.

In FIG. 5, information concerning the icons 1010 which are registered by the icon registration unit 51 described in FIG. 3 is registered in icon registration data 60. The icon registration data 60 includes fields of an "icon ID", a "position ID", and a "function". The icon ID is a unique icon ID which is generated when the icon registration unit 51 registers an icon. FIG. 5 exemplifies a case in which three icons of "1", "2", and "3" are registered as icon IDs. The "position ID" denotes the display position denoted by "a" to "l" on the touch panel which is described in FIG. 2. The "function" denotes the operation of the image forming apparatus 1 which is associated with the respective icons. For example, for the icon having the icon ID 2 and the display position is "f", when the icon is pressed, a scanning operation is initiated. In addition, in FIG. 5, position IDs is registered with respect to all of icon IDs. However, a non-display icon may be registered in advance in the touch panel 101 by registering only the function of the icon, and not registering the position ID, for example.

Figure 6:
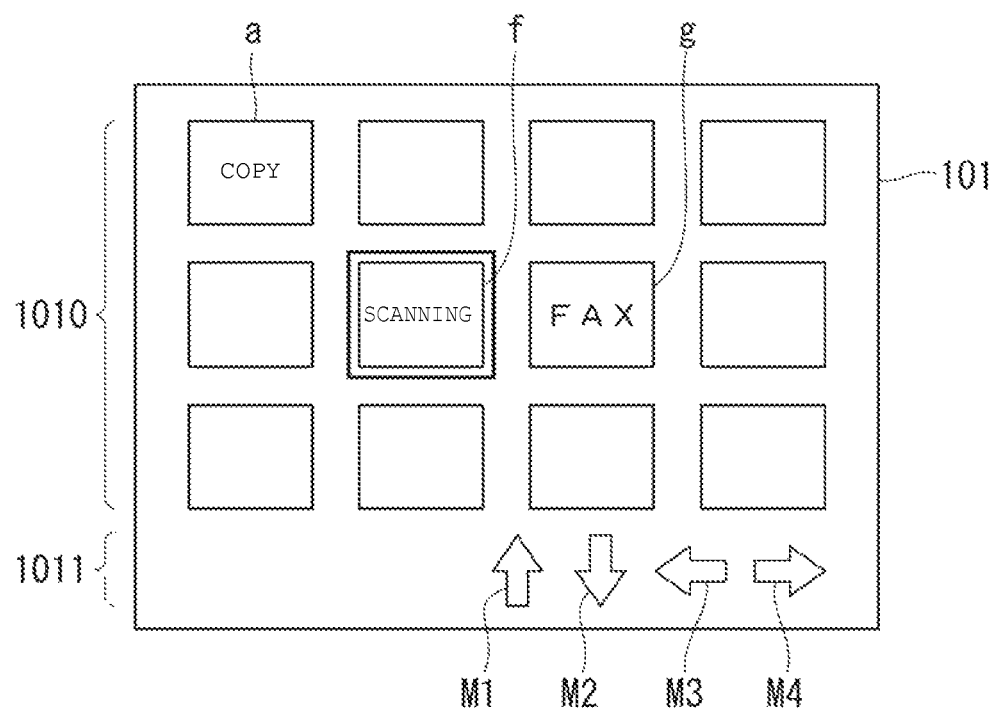
FIG. 6 is a diagram illustrating an example of icons displayed on a touch panel according to the first icon registration data.

FIG. 6 is a diagram illustrating an example of icons displayed on a touch panel according to the a first icon registration data shown in FIG. 5. In FIG. 6, an icon having the ID of 1 in FIG. 5 is displayed as a text display button "copy" which is the registered function at position "a" of the icon 1010. Similarly, the icon denoted icon ID 2 in FIG. 5 is displayed as the text display button "scanning" at position "f", and the icon which has the ID 3 is displayed as the text display button "FAX" at position "g" on the touch panel.

Here, an example where a user changes the display position of the icon having the ID is 2 which is at the display position of "f", and is displayed on the touch panel of FIG. 6 as "scanning" will be described.

The user presses the "scanning" icon at display position "f". A double lined box in the text button of "scanning" illustrated in FIG. 6 denotes that the icon has been pressed and thus selected. From the display location "f", the icon may be moved in any direction of up and down and left and right using the movement arrows M1 to M4. Accordingly, the movement button 1011 is displayed to be pressable in all directions provided by arrows M1 to M4. Here, it is assumed that the user presses the right button M4 in order to move the "scanning" icon to the position "g".

Figure 7:
FIG. 7 is a diagram depicting a second icon registration data according to the embodiment.

FIG. 7 is a diagram depicting the status of the second icon registration data when the user presses the right button M4. In FIG. 7, in the icon registration data 60, the position of the icon designated or identified (ID'd) as 2 is updated to the location designation "g" from the source location "f". On the other hand, the position ID of the icon designated 3 which was originally at the position location "g" is updated to position "f", which was the origin position location of the icon designated as 2.

Figure 8:
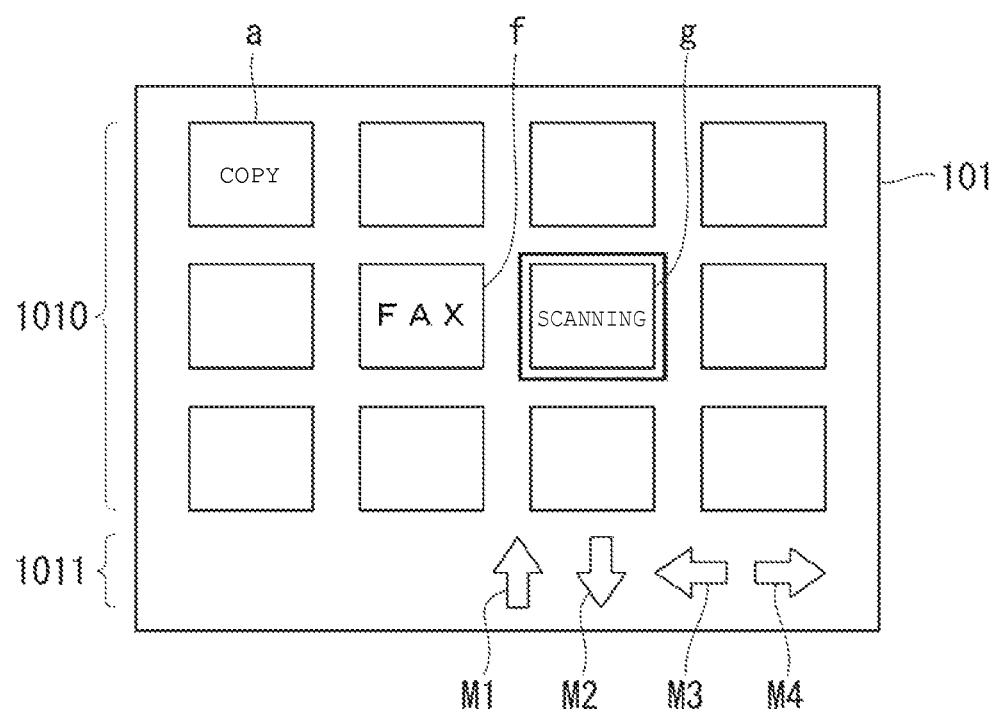
FIG. 8 is a diagram illustrating an example of icons displayed on a touch panel according to the second icon registration data.
Figure 9:
FIG. 9 is a diagram depicting a third icon registration data according to the embodiment.

FIG. 8 is a diagram illustrating the icons registered as shown in FIG. 7 in the new positions thereof. In FIG. 8, the "FAX" icon having the icon ID 3 is displayed at the display position of "f", and the "scanning" icon having the icon ID 2 is displayed at the display position of "g". That is, the display position of the icon for "FAX" and the display position of the icon for "scanning" are now switched in comparison to their positions in FIG. 6. The "scanning" icon is also shown, in the "g" position, having a double lined box, illustrating to the user that the icon may be again moved by touching of one of the movement arrows. Because the "scanning" icon in the display position "g" may be moved in any of the directions up, down, left and right, all four of the movement buttons 1011 are displayed and active for pressing in all of the directions of arrows M1 to M4. Next, a user presses the down button M2 when the icon 2 is in the position g as shown in FIG. 8. FIG. 9 is a diagram depicting a third icon registration data set resulting from the pressing of the down button M2 in FIG. 8. In FIG. 9, in the icon registration data 60, the position ID location of the icon 2 has been updated to the destination "k" from the source location "g". On the other hand, since the display position of the destination "k" was in an empty state in which there was no registered icon prior to the movement of icon 2 to that location, when the icon 2 is moved from position "g", the display position "g" enters an empty state, i.e., it remains blank.

Figure 10:
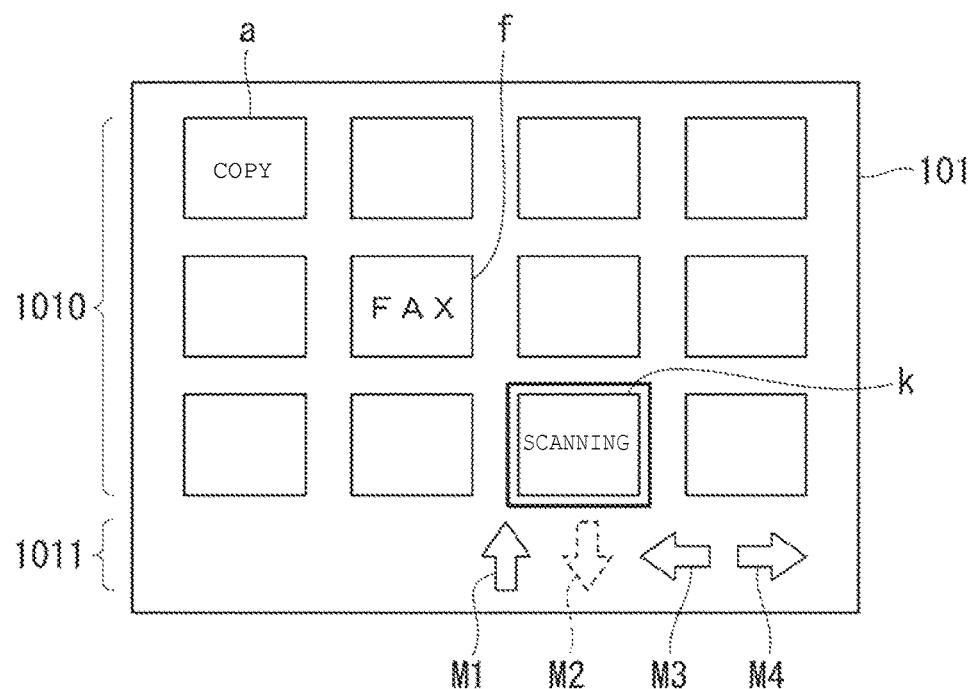
FIG. 10 is a diagram illustrating an example of icons displayed on a touch panel according to the third icon registration data.

FIG. 10 is a diagram illustrating an example of icons displayed on the touch panel according to the third icon registration data. In FIG. 10, the "scanning" icon having the icon ID 2 is displayed at the display position "k". From the display position "k", the icon cannot be moved in a lower direction. Accordingly, the down button M2 of the movement button 1011 cannot be activated. In order to inform a user that the button cannot be activated, the shape of the movement button in the direction in which movement cannot be made may be changed. As a method of changing a shape of the movement button, a display color of the movement button may be changed, for example. FIG. 10 exemplifies a case in which the down button M2 is displayed in a "gray-out" state. In addition, when a movement button which is displayed in the gray-out state is pressed, a pop-up which denotes that the selected movement is not possible may be displayed on the touch panel 101.

In addition, a movement button in the direction in which a movement cannot be made may be in a non-displayed state in order to inform a user that the movement direction(s) indicated by the not displayed button cannot be activated.

Figure 11:
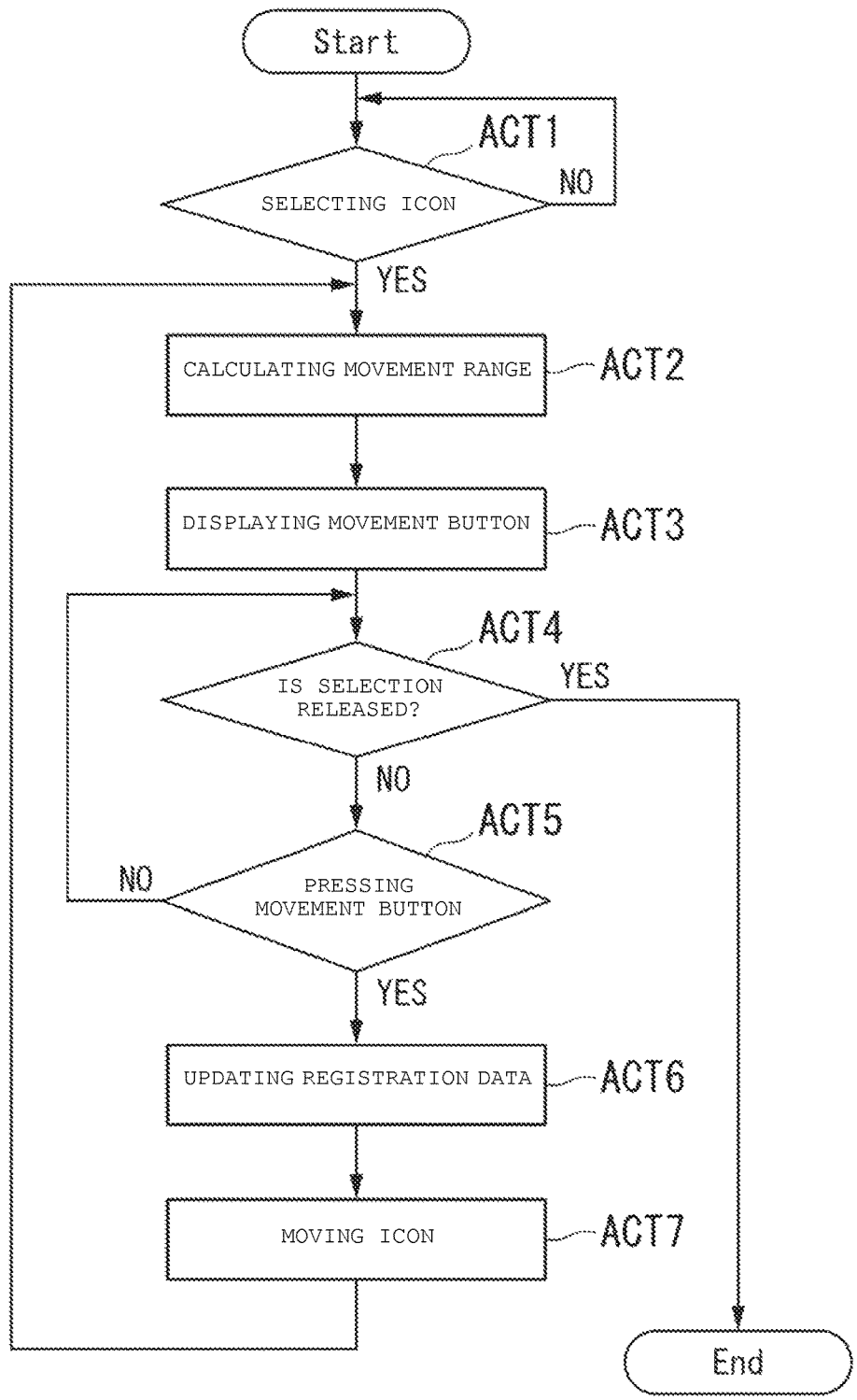
FIG. 11 is a flowchart depicting operations of a moving control of an icon according to the embodiment.

Hereinafter, a method of movement control of the icon using the display control unit 10 will be described using FIGS. 11 and 12. FIG. 11 is a flowchart depicting operations of the movement control of the icon according to the embodiment. In addition, a case will be exemplified in which the following control is executed using the icon registration unit 51 of the display control unit 10.

In FIG. 11, the icon registration unit 51 determines whether or not any one of icons which are displayed on the touch panel is pressed and selected (ACT 1). When an icon is not selected (NO in ACT 1), the process is repeated until the icon is selected.

When an icon is selected (YES in ACT 1), the icon registration unit 51 calculates a movement range of the selected icon (ACT 2). As a method of calculating the movement range, a method of determining whether or not the movement is possible from the selected position ID is exemplified.

For example, in the touch panel described in FIG. 2, twelve display positions of three rows by four columns denoted by "a" to "l" are registered. When a display position of "a" is set to "0", a display position of "l" is set to "11", all of icons may move in a range of the display position of 0 to 11. Here, when the left button M3 is pressed, "−1" is added to the original display position, and when the right button M4 is pressed, "+1" is added to the original display position. In addition, when the up button M1 is pressed, "−4" representing the number of display positions in a column (4) is added to the original position. In addition, when the down button M2 is pressed, "+4" with which the number of display positions in a column (4) is added to the original position. If the addition result of the positive or negative whole number exceeds the range of 0 to 11, the selected icon cannot be moved from its original position. That is, where the calculation result is a negative value, and where the icon position calculation result exceeds a maximum number equal to the number of available icon positions minus 1. For example, a display position of "f" is "5". Accordingly, it is determined that "f" may be moved whatever movement button 1011 may be pressed. On the other hand, since a display position of "k" is 10, and since 10+4=14, which is calculated when the down button M2 is pressed, exceeds the maximum number 11 of the icon positions, it is determined that "k" cannot be moved downward.

In addition, the method of determining the movement range is not limited to the above described calculation method, and may be executed using another method. For example, a direction in which a display position may be moved may be registered in advance in each display position.

In addition, when the icon is constituted by a plurality of pages, or when the icon is denoted by scrolling, a display page may be switched along with a movement of the icon, or the icon may be displayed using scrolling.

Subsequently, a movement button denoting a direction in which a movement may be performed is displayed based on the result calculated in processing in ACT 2 (ACT 3). The down button M2 which is described in FIG. 10 is displayed in a gray-out state due to processing in ACT 3.

Subsequently, whether or not the selection of the icon is released is determined (ACT 4). The releasing of the selection of the icon may be executed using a resetting switch of the hard key pad group 102, for example. When the selection of the icon is released (YES in ACT 4), the movement processing of the icon using the flowchart is ended.

When the selection of the icon is not released (NO in ACT 4), whether or not any one of the movement buttons 1011 is pressed is determined (ACT 5). When the movement button 1011 is not pressed after a preselected period of time (NO in ACT 5), the process returns to the process in ACT 4.

When the movement button 1011 is pressed in the preselected period of time (YES in ACT 5), the icon registration data 60 is updated (ACT 6). Detailed processing in ACT 6 will be described using FIG. 12. FIG. 12 is a flowchart depicting an updating process of the icon registration data 60 according to the embodiment in ACT 6.

Figure 12:
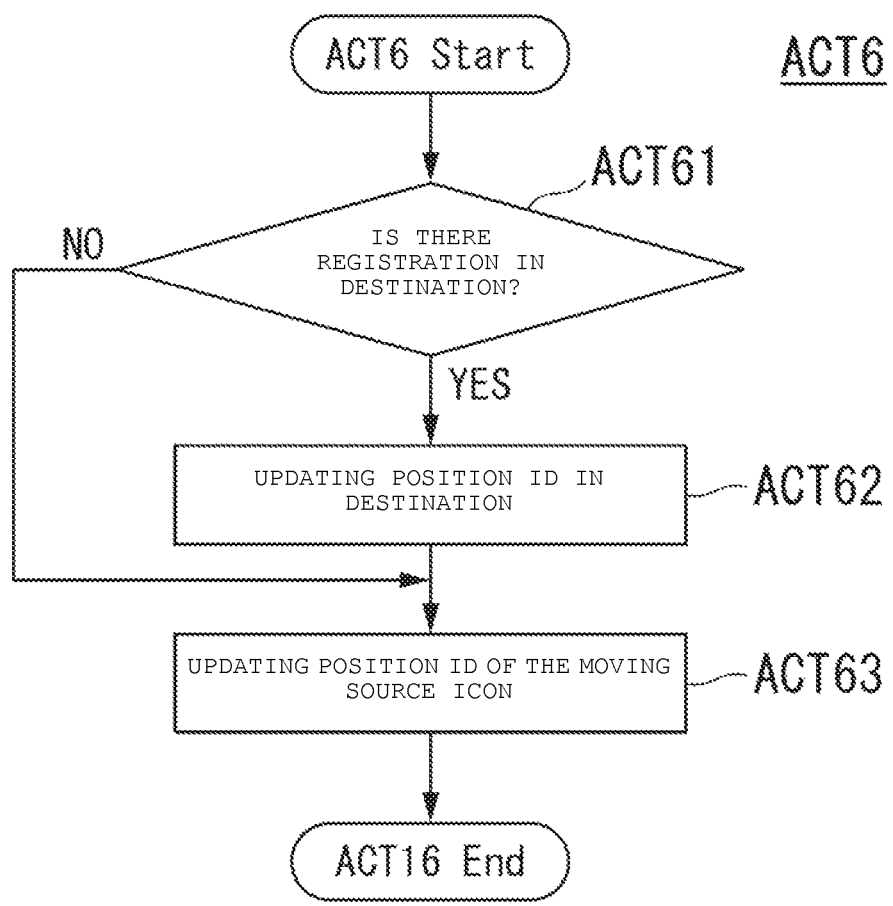
FIG. 12 is a flowchart depicting updating processing of icon registration data according to the embodiment.

In FIG. 12, whether or not another icon is registered at a destination display position is determined (ACT 61). When another icon is registered in the destination position (YES in ACT 61), the position ID of the icon which is registered at the destination display position is updated, i.e., switched, to the original position ID of the source icon, i.e., the original position of the icon being moved (ACT 62).

On the other hand, when another icon was not registered at the destination display position (NO in ACT 61), the processing in ACT 62 is skipped.

Subsequently, the position ID of the moving source icon is updated to the position ID of the destination (ACT 63). Hitherto, the processing in ACT 6 is ended.

Returning to FIG. 11 again, the icon registration unit 51 moves the icon which is displayed on the touch panel 101 based on the icon registration data 60 which is updated due to the processing in ACT 6 (ACT 7). The movement range is recalculated based on the display position of the icon which is moved in the processing in ACT 7 (ACT 2).

In addition, the operations of the display control unit which are described using FIGS. 11 and 12 are not limited to the case of being controlled by the icon registration unit 51. For example, the CPU 11 which is described in FIG. 1 may perform the display control.

According to at least one of the above described embodiments, in the image forming apparatus, it is possible to register an icon by easily moving a display position of the icon without removing the original icon after newly registering the icon with the same function at a destination position of the icon which is displayed on the touch panel, by including the operation display unit, the display range registration unit, the icon registration unit, and the control unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an operation display panel configured to display an icon for selecting an operation of the image forming apparatus;
a display range registration unit in which information on a display range of the icon displayed on the operation display panel is registered;
an icon registration unit in which information on a display position of the icon on the operation display panel is registered; and
a display control processor configured to display a movement button for moving the icon when the icon is selected, based on the information on the display range of the icon which is registered for that icon in the display range registration unit, and to update the information on the display position of the icon which is registered in the icon registration unit when the movement button is pressed;
wherein when an icon is selected, the display control processor is further configured to:
add a whole number representing a position of the selected icon to each of numerical values assigned to the movement buttons;
compare each addition result to a range of whole numbers representing icon positions of the display range; and
disable each of the movement buttons having an addition result that is outside the range of icon position numbers of the display range.

2. The apparatus according to claim 1,
wherein the display control processor is configured to change a shape of the movement button pointing in a direction in which the icon is not capable of being moved based on the information on the display range which is registered in the display range registration unit.

3. The apparatus of claim 1, wherein the display control processor is configured to change a gray scale image of the movement button pointing in a direction in which the icon is not capable of being moved based on the information on the display range which is registered in the display range registration unit.

4. The apparatus according to claim 1,
wherein the display control processor is configured to cause the movement button pointing in a direction in which the icon is not capable of being moved to not be displayed when the information on the display range which is registered in the display range registration unit indicates that the icon cannot be moved from a current position of the icon in the denoted direction.

5. The apparatus according to claim 1,
wherein, the display control processor is configured, such that if another icon is registered in a selected destination position of an icon selected for movement when the movement button is pressed, to update information on a display position of the another icon which is registered in the icon registration unit to the display position of the icon selected for movement.

6. A control method for positioning control icons on a touch display associated with an image forming apparatus, comprising:
registering a display range in which information for the display range of icons for selecting an operation of the image forming apparatus may be displayed on a display unit;
registering an icon, for which information on a display position of the icon is registered, in an operation display panel;
selecting an icon on the display unit;
displaying in the display unit one or more movement buttons for moving the selected icon, based on the information on the display range which is registered in the registering of the display range;

adding a whole number representing the icon position to each of numerical values assigned to the movement buttons;

comparing each addition result to a range of whole numbers representing icon positions of the display range; and disabling each of the movement buttons having an addition result that is outside the range of icon position numbers of the display range; and updating the registration information of the display position of the icon when one of the movement buttons is pressed.

7. The method according to claim 6,
wherein a shape of a movement button pointing in a direction in which the icon is not capable of being moved to is changed based on the information on the registered display range.

8. The method according to claim 6,
wherein a movement button pointing in a direction in which the icon is not capable of being moved to is not displayed based on the information on the registered display range.

9. The method according to claim 6,
wherein if another icon is registered in a destination location of an icon selected to be moved when the movement button is pressed, information on a display position of the another icon is updated to the original display position of the icon selected to be moved.

10. The method according to claim 6, further comprising:
changing the display appearance of the icon upon selection of the icon.

11. The method of claim 6, further comprising:
associating a display icon with an icon value; and
correlating the icon value with a display location in the registration information.

12. An apparatus for managing the display and position of icons which are representative of selectable process functions on an image processing device and are displayable on a touch screen display, comprising:
a plurality of icon display locations, each location including a location identity, for display of the icons on the touch screen display;
a plurality of icons, each icon associated with an icon value;
a registration database, in which the icon location identity is associated with an icon value if an icon is displayed at the location on the touch screen display represented by the location identity; and
a location change unit configured to move an icon display location to a different location irrespective of the presence of an additional icon at the different location and including a plurality of movement buttons, wherein, when an icon is selected the location change unit is further configured to:
add a whole number representing a position of the selected icon to each of numerical values assigned to the movement buttons;
compare each addition result to a range of whole numbers representing icon positions of a display range; and
disable each of the movement buttons having an addition result that is outside the range of icon position numbers of the display range.

13. The apparatus of claim 12, wherein the registration database is configured to track the change in the location of an icon moved using the location change unit.

14. The apparatus of claim 12, further comprising:
a logic unit associated with the registration database, wherein the logic unit calculates the available directions of movement for an icon.

15. The apparatus of claim 14, wherein
the logic unit is operatively coupled to the location change unit; and
the location change unit is modified by an instruction from the logic unit to indicate location changes on the touch screen which are not available for a particular icon.

16. The apparatus of claim 15, wherein the modification of the location change unit includes changing a feature of a movement button displayed on the touch screen.

* * * * *